(12) United States Patent
Rudgley et al.

(10) Patent No.: US 9,630,268 B2
(45) Date of Patent: Apr. 25, 2017

(54) CUSTOMIZED AND VARYING CROSS-SECTION ELECTRODES

(75) Inventors: Mervyn Rudgley, Costa Mesa, CA (US); James Legge, Rancho Palos Verdes, CA (US)

(73) Assignee: Perfect Point EDM Corp., Huntington Beach, CA (US)

(*) Notice: Subject to any disclaimer, the term of this patent is extended or adjusted under 35 U.S.C. 154(b) by 803 days.

(21) Appl. No.: 14/118,017

(22) PCT Filed: Jan. 12, 2012

(86) PCT No.: PCT/US2012/021130
§ 371 (c)(1),
(2), (4) Date: Feb. 24, 2014

(87) PCT Pub. No.: WO2012/097187
PCT Pub. Date: Jul. 19, 2012

(65) Prior Publication Data
US 2014/0175064 A1    Jun. 26, 2014

Related U.S. Application Data

(60) Provisional application No. 61/461,116, filed on Jan. 13, 2011.

(51) Int. Cl.
*B23H 1/04* (2006.01)
*B23H 1/10* (2006.01)
*B23H 9/00* (2006.01)

(52) U.S. Cl.
CPC .............. *B23H 1/04* (2013.01); *B23H 1/10* (2013.01); *B23H 9/001* (2013.01)

(58) Field of Classification Search
CPC ... B23H 1/04; B23H 1/10; B23H 7/04; B23H 9/001
See application file for complete search history.

(56) References Cited

U.S. PATENT DOCUMENTS

| | | | |
|---|---|---|---|
| 6,627,054 B2 * | 9/2003 | Wei | B23H 9/16 204/224 M |
| 2008/0230378 A1 | 9/2008 | Lee et al. | |
| 2010/0096365 A1 | 4/2010 | Gold | |

* cited by examiner

*Primary Examiner* — Brian Jennison
(74) *Attorney, Agent, or Firm* — Baker & Hostetler LLP

(57) ABSTRACT

Erosion electrodes and associated devices, systems, and methods for providing improved performance during a process driven by FEED and facilitated by fluid flushing of a worksite is disclosed. Use of erosion electrodes having varying cross-sectional geometries result in customizable channels, within which the FEED process may proceed, improving efficiency and efficacy of the process as the erosion electrode is advanced longitudinally into a workpiece.

17 Claims, 12 Drawing Sheets

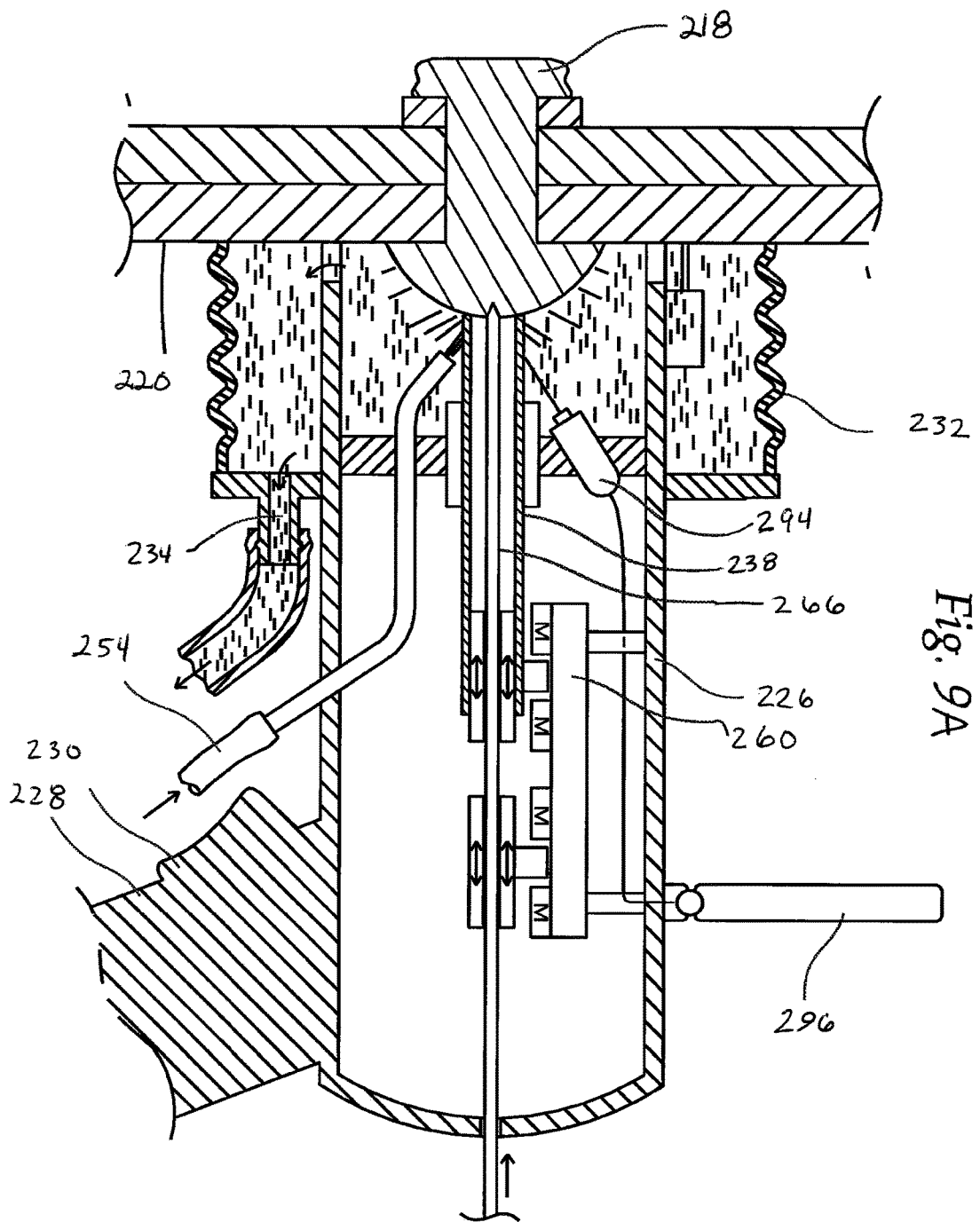

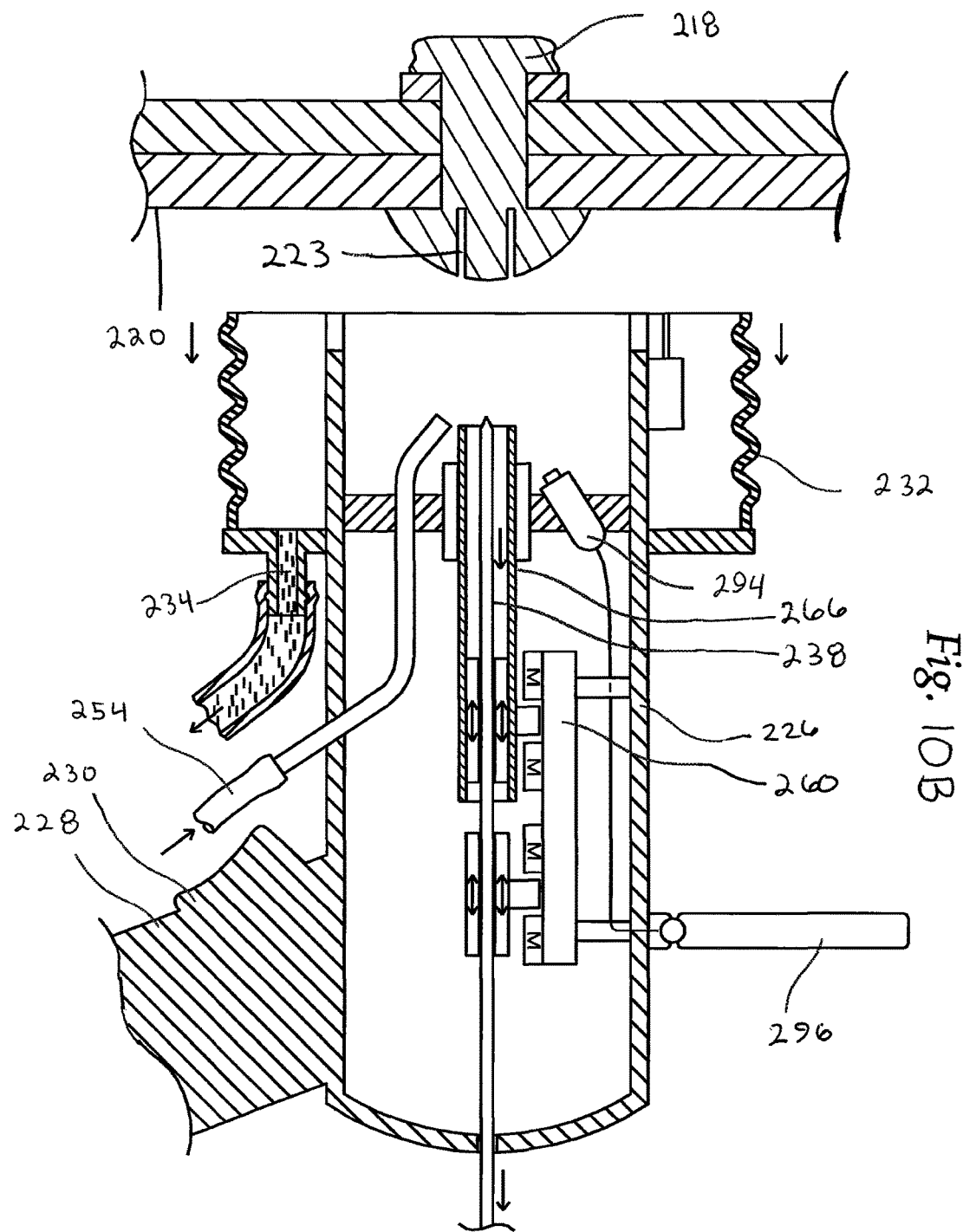

CUSTOMIZED AND VARYING CROSS-SECTION ELECTRODES

RELATED APPLICATION

This application claims the full Paris Convention benefit of and priority to U.S. Provisional Application Ser. No. 61/461,116, filed Jan. 13, 2011, the contents of which is incorporated herein by reference, as if fully set forth herein.

BACKGROUND

1. Field

This disclosure relates to electrodes for forceless electrical emission disintegration of a workpiece.

2. General

Single-use fasteners, such as a rivet or aerospace fastener where the fastener is formed during the assembly process, is common in many industries. In aerospace, the maintenance of air frames frequently requires removal of hundreds of fasteners in order to replace or repair structural members such as longerons, bulkheads, center barrels, and the like. Fasteners commonly include rivets or threaded fasteners which have been malleably distorted so they cannot be directly removed. Many of these fasteners are manufactured in titanium or other difficult to machine materials.

For example, during assembly, an extended portion often referred to as a "shank" of a fastener extends through one or more frames and may be pulled with respect to a collar on the opposite side. When the appropriate tension in the fastener shank is achieved, the collar may be malleably crushed against the shank of the fastener to form a permanent structure. Removal of the fastener and collar from the frame(s) may be challenged due to the fixation of the fastener and the collar, the toughness of the materials used for fasteners and collar, and the delicate condition of surrounding frames to which they are applied.

Traditional methods which have been utilized for many years to remove such fasteners have been to machine away the head of the fastener with a drill which is manually positioned. The drill adds pressure to the region being drilled as well as heat. Additionally, when the fastener is of titanium or other difficult to machine materials, such drilling results in a significant consumption of drill bits. Traditional drilling of fasteners operation has a known risk of damage to the structure in which the fastener is engaged. Damage to surrounding structures may result from vibration, drill bit slips, or drilling too deep. If drill bit slippage damage occurs to the surrounding material, or if the hole should be cut too deep, an oversized fastener might be used during reassembly, or the entire component may need to be replaced. Measures to correct such undesirable damage may result in additional expense associated with the operation.

In some cases, safety regulations and guidelines indicate a maximum number of errors that can be diagnosed and treated before an entire portion of a workpiece must be abandoned and replaced. Some regulations and guidelines may also require inspections of areas which appear to have had drill damage to assess the proper corrective action, if any. Such diagnostics require time, may cause delay, and may result in costs.

Electric discharge machining, or EDM, is an established method and apparatus utilized for machining metal. It operates through the utilization of an electrical discharge to remove metal from the workpiece. In the EDM process, an electrode is brought into close proximity to the workpiece. High voltage is applied in pulses at high frequency. The process occurs in the presence of a dielectric fluid. This creates sparking at generally the closest position between the workpiece and the electrode. Particles are removed from the workpiece when sparking is quenched. The duration of the spark (on-time) and the recovery time (off-time) are controlled so that the workpiece and electrode temperatures are not raised to the temperature of bulk melting. Therefore, erosion is essentially limited to a vaporization process.

DESCRIPTION

In one or more exemplary implementations an erosion electrode with an axial length including a distal segment and a proximal segment is provided, with at least a portion of the distal segment having a cross-sectional geometry that is distinct from a cross-sectional geometry of at least a portion of the proximal segment.

In one or more exemplary implementations an erosion electrode with an axial length including a distal segment and a proximal segment is provided with at least a portion of the distal segment having a cross-sectional geometry that is at least one of larger or smaller from a cross-sectional geometry of at least a portion of the proximal segment.

In one or more exemplary implementations an erosion electrode with an axial length including a distal segment and a proximal segment is provided with at least a portion of the distal segment having a cross-sectional geometry that is at least one of a different geometric configuration (including but not limited to circle, oval, polygon, and curves) distinct from a cross-sectional geometry configuration of at least a portion of the proximal segment.

In some exemplary implementations there is disclosed a FEED method or procedure of providing an erosion electrode of varying cross-sectional geometry to a conductive work piece and flowing a dielectric fluid between the erosion electrode and the workpiece. Thereafter providing an electrical potential between the erosion electrode and the workpiece and advancing the erosion electrode into the workpiece, whereby a channel of varying cross-sectional geometry is formed in the workpiece.

DRAWINGS

The above-mentioned features of the present disclosure will become more apparent with reference to the following description taken in conjunction with the accompanying drawings wherein like reference numerals denote like elements and in which:

FIG. 9A shows a sectional view of a hand-held EDM device, shown in association with a fastener receiving a pilot hole;

FIG. 10B shows a sectional view of a hand-held EDM device, shown after an erosion process in association with a fastener to be removed;

FURTHER DESCRIPTION

As used herein, "cross-sectional geometry" is defined as attributes of an object determinable from a cross-sectional view of the object. The attributes include—but are not limited to—shape, size, outer radius, and inner radius.

According to one or more exemplary implementations, a forceless electrical erosion and disintegration or "FEED" (which is a type of electric discharge machining, or EDM) process includes the advancement of an electrode into a workpiece to erode, shape, define, or otherwise modify the workpiece as a product of one or more dielectric breakdown events between the electrode and the workpiece. Such a process may have a variety of applications and uses, some examples of which being disclosed in U.S. application Ser. No. 12/603,507, filed Oct. 21, 2009 which is incorporated by this reference as if fully set forth herein.

Figure 1A:
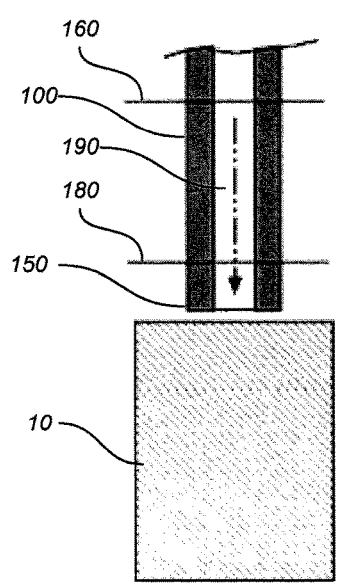
FIG. 1A shows some aspects of a cross-sectional view of an erosion electrode approaching a workpiece.

According to one or more exemplary implementations, as shown in FIG. 1A, erosion electrode 100 (depicted here as tubular) is provided to a workpiece. Erosion electrode 100 may have a substantially consistent, non-varying, or homogeneous cross-sectional geometry. For example, proximal section 160 and distal section 180 may have substantially similar or equivalent cross-sectional geometries, as shown in FIG. 1A.

Figure 1C:
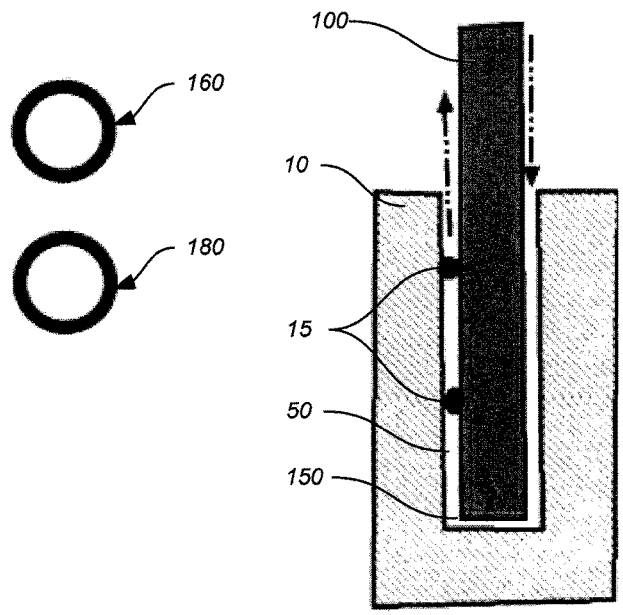
FIG. 1C shows some aspects of a magnified cross-sectional view of an erosion electrode within a workpiece.
Figure 1B:
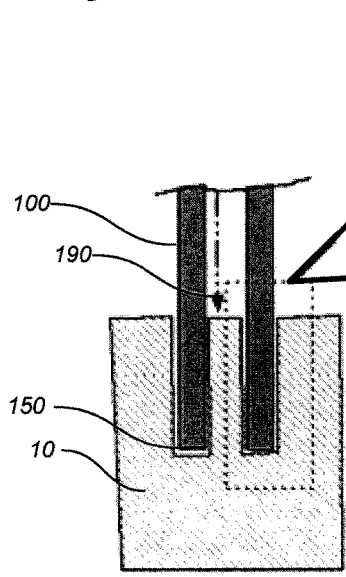
FIG. 1B shows some aspects of a cross-sectional view of an erosion electrode within a workpiece.
Figure 1D:
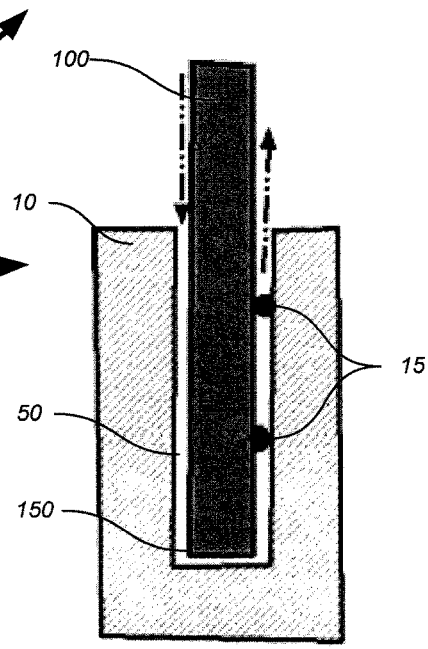
FIG. 1D shows some aspects of a magnified cross-sectional view of an erosion electrode within a workpiece.

According to one or more exemplary implementations, as shown in FIG. 1B, erosion electrode 100 is advanced within workpiece 10 as the FEED process causes erosion of workpiece 10, forming eroded space 50. According to one or more exemplary implementations, a dielectric fluid may be provided in quality, quantity, and flow rate to facilitate FEED spark events, regulate temperature of the workpiece, or transport debris created during the process. High voltage is applied in pulses at high frequency. The process occurs in the presence of a dielectric fluid. This creates sparking at generally the closest position between the workpiece and the electrode. Particles are transported from the workpiece with fluid flow. As shown in the figures, dielectric fluid "DF" may be provided to or from lumen 190 of erosion electrode 100. Lumen 190 may be in fluid communication with a dielectric inlet (not shown, but described in applicants' co-pending U.S. application Ser. No. 12/603,507, filed Oct. 21, 2009) and/or dielectric outlet to deliver the dielectric fluid to a workspace between erosion electrode 100 and workpiece 10. As shown in FIGS. 1C and 1D, debris 15 created (from workpiece 10 or erosion electrode 100) during the FEED process is cleared from the space "DG" (also referred to as the dielectric gap or an overcut gap) between erosion electrode 100 and workpiece 10 by the flow of the dielectric fluid "DF". In some cases, where debris 15 is not properly evacuated, its presence may alter operation of the FEED process by altering the characteristics of the dielectric gap between erosion electrode 100 and workpiece 10. For example, debris 15 lodged between electrode 100 and workpiece 10 may prevent a desired spark event, cause a short or reduce efficiency of the process by electrically bridging the dielectric gap "DG" due to conductivity of debris 15.

According to one or more exemplary implementations, in addition to erosion of workpiece 10, erosion electrode 100 experiences its own erosion. Distal end 150 of erosion electrode 100 may recede during a FEED processes. Generally speaking, erosion electrode 100 and eroded space 50 achieve complementary mirror-image geometries, with a gap between erosion electrode 100 and workpiece 10 where spark events occur.

As erosion electrode 100 of homogenous cross-section (e.g., straight tube) cuts deeper into workpiece 10, various issues may arise. The flushing path into eroded space 50, around distal end 150, and out of eroded space 50 becomes longer. Resistance to flow of the flushing fluid (which may also be the dielectric fluid DF) increases, causing slower flushing fluid flow. Consequently, the rate at which debris 15 is removed is reduced, increasing debris accumulation within eroded space 150. By drawing spark events away from distal end 150 of erosion electrode 100, energy provided for spark events may be wasted on erosion which does not contribute to deepening the eroded space.

Furthermore, any tipping of erosion electrode 100 (i.e., a central axis of erosion electrode 100) relative to a prior alignment with respect to workpiece 10 causes the gap between erosion electrode 100 and workpiece 10 to vary. In some cases, this may bridge the gap between erosion electrode 100 and workpiece 10 or otherwise change the characteristics contributing to spark events across the dielectric. For example, tipping of erosion electrode 100 may cause a side of the electrode to touch the top edge of the hole, resulting in a short. As eroded space 50 becomes deeper, these issues are magnified in that less tipping is required to produce undesirable results.

Figure 2A:
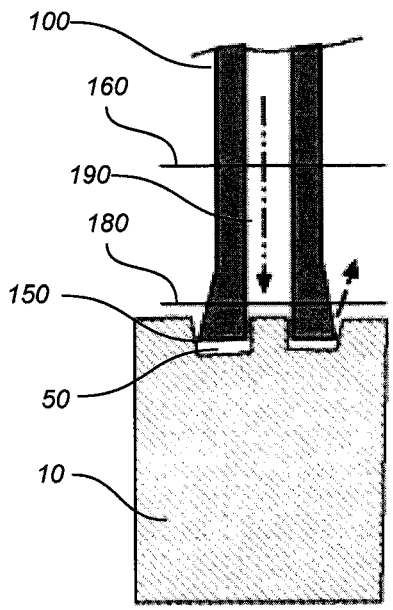
FIG. 2A shows some aspects of a cross-sectional view of an erosion electrode within a workpiece.
Figure 2A:
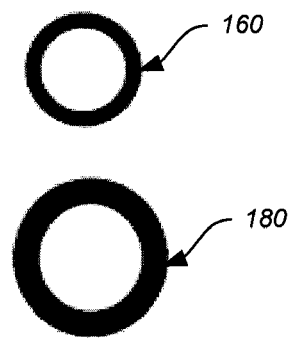
Figure 2B:
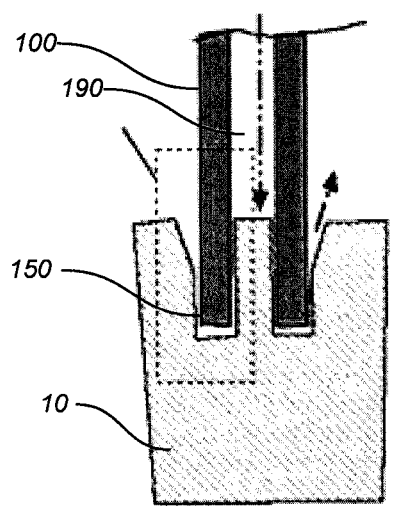
FIG. 2B shows some aspects of a cross-sectional view of an erosion electrode within a workpiece.
Figure 2C:
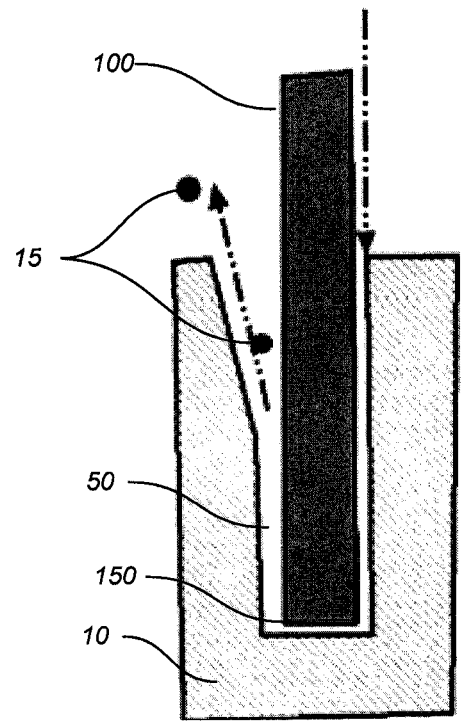
FIGS. 2C and 2D show some aspects of a magnified cross-sectional view of an erosion electrode within a workpiece.
Figure 2D:
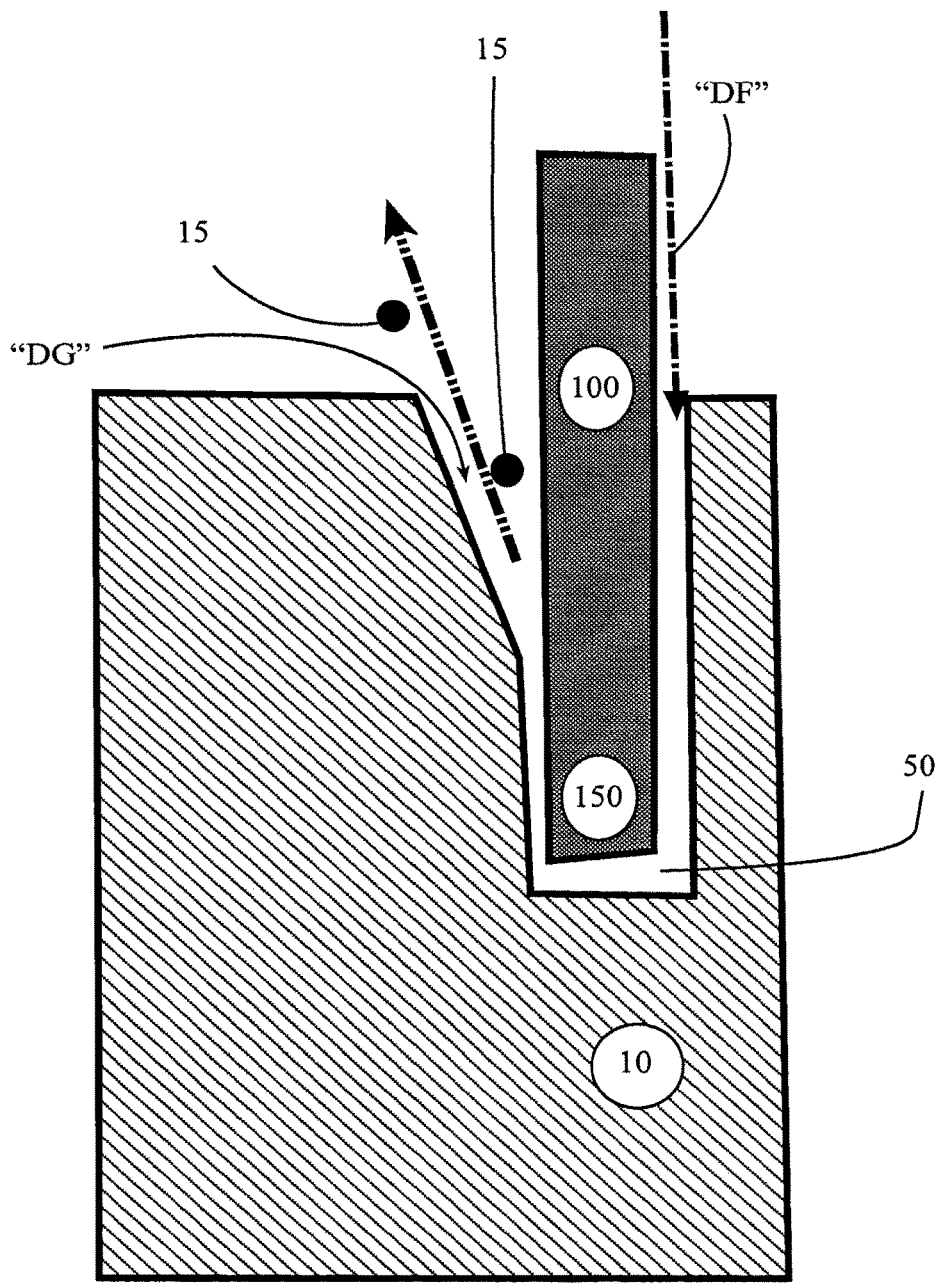

According to one or more exemplary implementations, erosion electrode 100 has a varying cross-sectional geometry across at least a portion of its axial length. According to one or more exemplary implementations, an outer diameter of erosion electrode 100 may be greater at one portion than at another. As shown in FIG. 2A, the outer diameter at distal section 180 at or near distal end 150 is greater than an outer diameter at proximal section 160. The transition from one outer diameter to another may be tapered, curved, gradual, stepped, etc. As shown in FIGS. 2B and 2C, a distal portion of erosion electrode 100 erodes, including distal section 180, whereby distal end 150 recedes until it reaches a proximal portion of erosion electrode 100, including 160, for example.

As the distal portion erodes, erosion electrode 100 defines eroded space 50 of complementary mirror-image geometry within workpiece 10. The result is that eroded space 50 presents a wider channel at the surface of workpiece 10. When the narrower proximal portion of erosion electrode 100 remains within the widened channel, an improved flow path for dielectric fluid is provided. Accordingly, debris is more efficiently and effectively evacuated from between erosion electrode 100 and workpiece 10. Likewise, tipping of erosion electrode 100 is less likely to cause contact with workpiece 10 at the top edge of the hole.

Figure 3A:
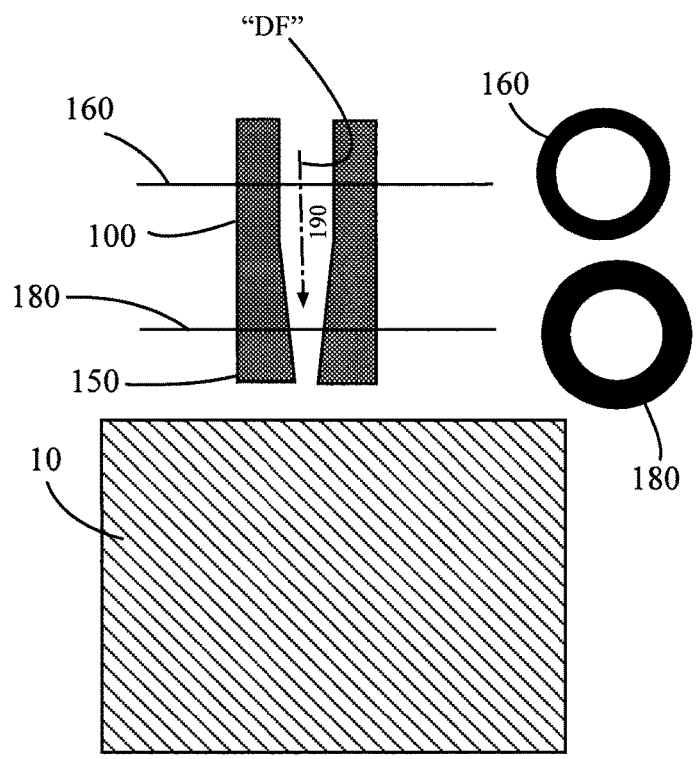
FIG. 3A shows some aspects of a cross-sectional view of an erosion electrode approaching a workpiece.
Figure 3B:
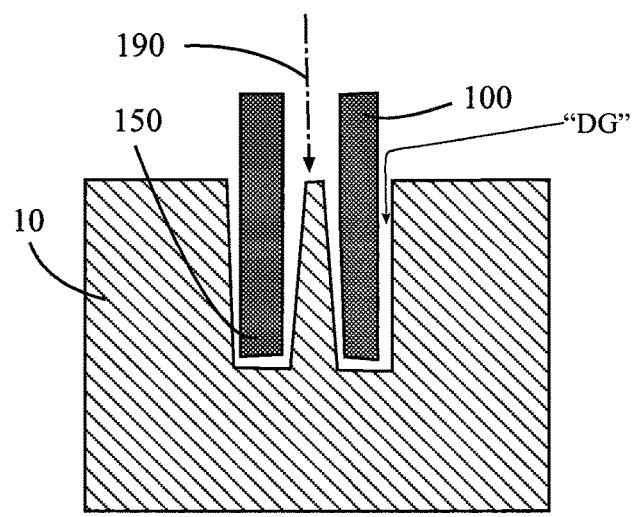
FIG. 3B shows some aspects of a cross-sectional view of an erosion electrode within a workpiece.

According to one or more exemplary implementations, an inner diameter of erosion electrode 100 may be greater at one portion than at another. As shown in FIG. 3A, an inner diameter at distal section 180 at or near distal end 150 is less than an outer diameter at proximal section 160. As shown in FIG. 3B, erosion electrode 100 defines eroded space 50 of complementary mirror-image geometry within workpiece 10.

According to one or more exemplary implementations, both an inner diameter and an outer diameter of erosion electrode 100 may be varied across the axial length. For example, an outer diameter at distal section 180 at or near distal end 150 is greater than an outer diameter at proximal section 160, and an inner diameter at distal section 180 at or near distal end 150 is less than an outer diameter at proximal section 160. By further example, the desired cross-section of eroded space 50 could be a "wedge" with the widest part of the wedge at the beginning of eroded space 50, and the narrowest at the bottom. The cross-section of the wall of erosion electrode 100 that provides this shape would itself begin as a flask-shaped distal portion that erodes to present a smaller and smaller cutting surface as eroded space 50 gets deeper.

Figure 4:
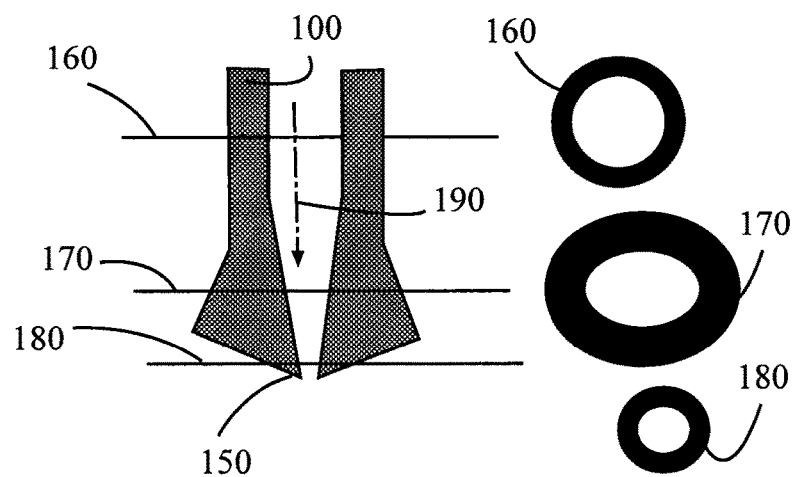
FIG. 4 shows some aspects of a cross-sectional view of an erosion electrode.
Figure 5:
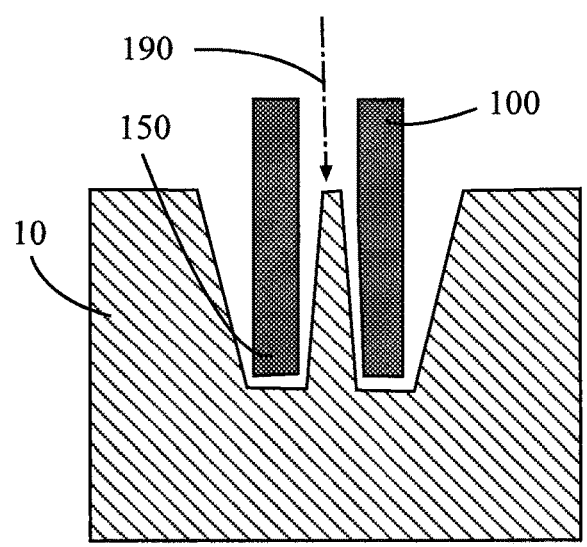
FIG. 5 shows some aspects of a cross-sectional view of an erosion electrode within a workpiece.

According to one or more exemplary implementations, cross-sectional geometries of erosion electrode 100 may increase and decrease along an axial length thereof. As shown in FIG. 4, an outer diameter at distal section 180 at or near distal end 150 is less than an outer diameter at medial section 170. The outer diameter at medial section 170 may, in turn, be greater than an outer diameter at proximal section 160. According to one or more exemplary implementations, a resulting workpiece 10 is shown in FIG. 5.

According to one or more exemplary implementations, a tapered distal section 180 may assist during alignment of erosion electrode 100 relative to workpiece 10. For example, where workpiece 10 has a cavity or other opening on a surface thereof, tapered distal section 180 of erosion electrode 100 may provide a corresponding mating feature that facilitates relative alignment by a "fit" within the cavity. Such operation may be performed prior to or during an erosion event.

Figure 6A:
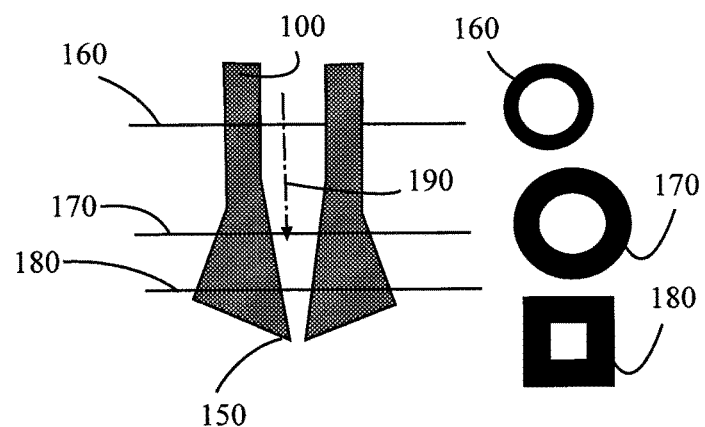
FIG. 6A shows some aspects of a cross-sectional view of an erosion electrode.

According to one or more exemplary implementations, other cross-sectional geometries vary along the axial length of erosion electrode 100. For example, cross-sectional shape may vary. Cross-sectional profiles at proximal section 160, medial section 170, and distal section 180, inter alia, may present at least two distinct shapes. For example, as shown in FIG. 5A, medial section 170 presents an ovoid shape and proximal section 160 presents a circular shape. By further example, as shown in FIG. 6A, distal section 180 may present a square shape and proximal section 160 presents a circular shape. Other shapes shall be appreciated by those having ordinary skill, such as polygonal, star, pointed, curved, scalloped, etc. The shape may define the inner diameter of a section, the outer diameter of a section, or both. Non-circular eroded space 50 may provide a mating feature for receiving a device for action therein. For example, a torque-imparting device (e.g., breaker bar, etc.), may be provided within eroded space 50 for effecting rotation of workpiece 10.

Figure 6B:
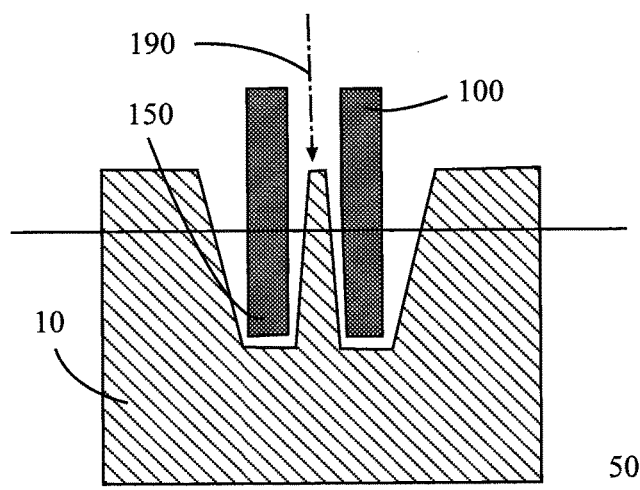
FIG. 6B shows some aspects of a cross-sectional view of an erosion electrode within a workpiece.
Figure 6C:
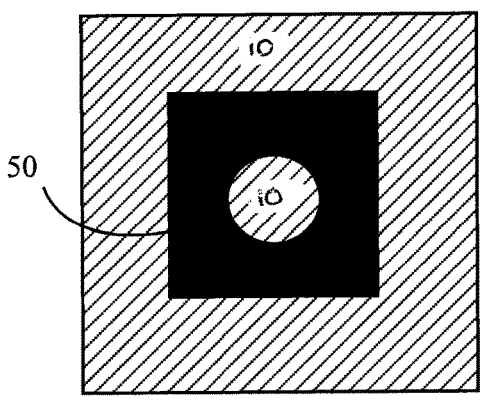
FIG. 6C shows some aspects of a cross-sectional view of a workpiece with eroded portions.

According to one or more exemplary implementations, as shown in FIGS. 6B and 6C, a portion of erosion electrode 100 (proximal, medial, distal, or other) having shape and size with greatest outer diameter or least inner diameter defines the upper portion of eroded space 50, including the opening thereof. For example, as shown in FIGS. 6A, 6B, and 6C, erosion electrode 100 may have a square portion 180 that extends radially outward at least as far as any other portion of erosion electrode 100. Accordingly the square portion 180 defines the widest outer boundary of the resultant eroded space 50, as shown in FIG. 6C. Accordingly, cross-sectional geometries are selected according to a desired outcome with respect to eroded space 50.

According to one or more exemplary implementations, any given portion of erosion electrode 100 may be of any length, according to desired outcome and suitable purposes. For example, a distal portion having a greater diameter than a proximal portion may be configured to be depleted before an erosion process is complete, such that distal end 150 reaches the proximal portion and at least a portion of the proximal portion contributes to the erosion. Accordingly, only a portion of eroded space 50 may be defined by the greater diameter of the distal portion. By further example, a distal portion having a greater diameter than a proximal portion may be configured to remain throughout an erosion process, such that distal end 150 never reaches the proximal portion. Accordingly, the entire length of eroded space 50 may be defined by the greater diameter of the distal portion.

Figure 7A:
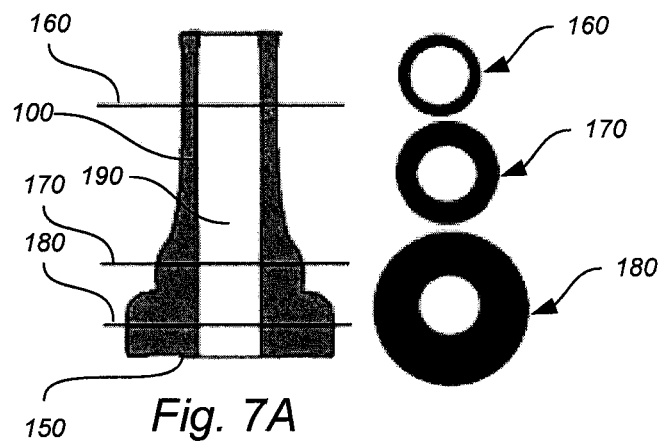
FIG. 7A shows some aspects of a cross-sectional view of an erosion electrode.
Figure 7B:
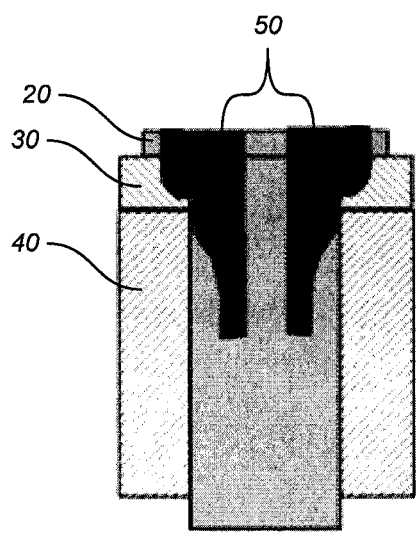
FIG. 7B shows some aspects of a cross-sectional view of a workpiece.

According to one or more exemplary implementations, portions of erosion electrode 100 may each fulfill a given purpose corresponding to workpiece 10. According to one or more exemplary implementations, as shown in FIG. 7A, erosion electrode 100 has distal section 180 having first cross-sectional geometry, medial section 170 having second cross-sectional geometry, and proximal section 160 having third cross-sectional geometry. Each of the first, second, and third cross-sectional geometries may be distinct. As shown in FIG. 7B, the workpiece 10 may have a non-homogenous composition. For example, workpiece may include fastener 20, first frame 30, second frame 40, inter alia. According to one or more exemplary implementations, as shown in FIG. 7B, distal section 180 may be configured to be exhausted within first frame 30 and before distal end 150 of erosion electrode 100 reaches second frame 40. Accordingly, only distal section 180 operates on first frame 30. As shown in FIG. 7B, where fastener 20 is present, medial section 170 may be configured to taper inward to avoid operation thereof upon second frame 40.

According to one or more exemplary implementations, one or more erosion electrodes 100 may be provided equidistant from a central axis and rotated about the central axis, providing a result analogous to a solid or hollow tubular electrode.

Figure 7C:
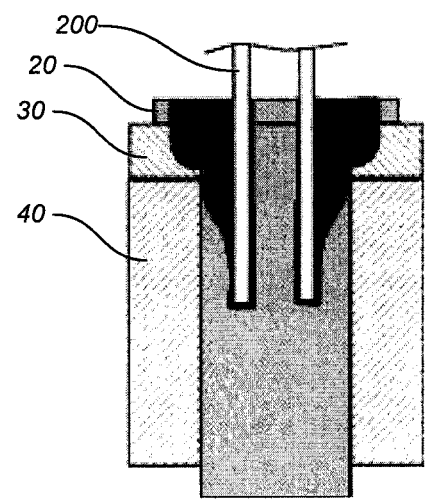
FIG. 7C shows some aspects of a cross-sectional view of a second electrode within a workpiece.

According to some exemplary implementations, as shown in FIG. 7C, second electrode 200 of a distinct profile compared to said first electrode may be provided to an eroded space 50 to continue operation. Accordingly, said first erosion electrode 100 may be configured and operated to provide an operating space in which said second electrode 200 is configured to be used. Those of ordinary skill in the art will also understand that erosion electrode 100 may be configured to have a second portion substantially the same as second electrode 200 rather than requiring electrode switching.

Figure 8A:
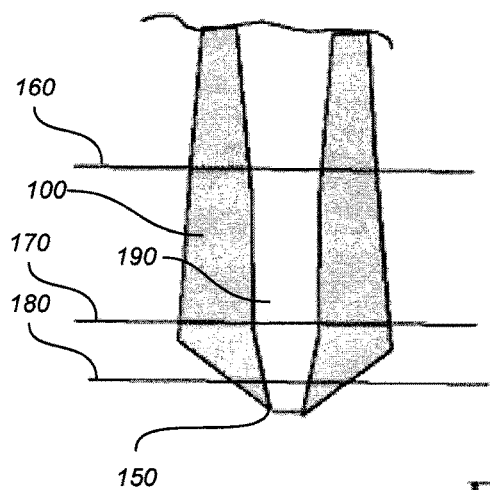
FIG. 8A shows some aspects of a cross-sectional view of an erosion electrode.
Figure 8A:
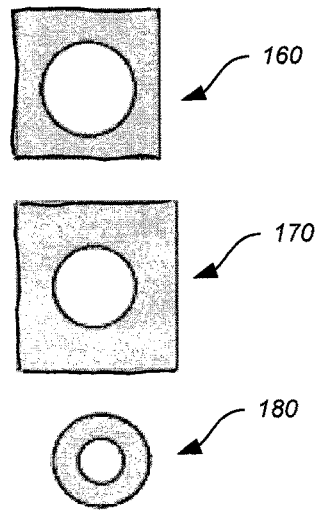
Figure 8B:
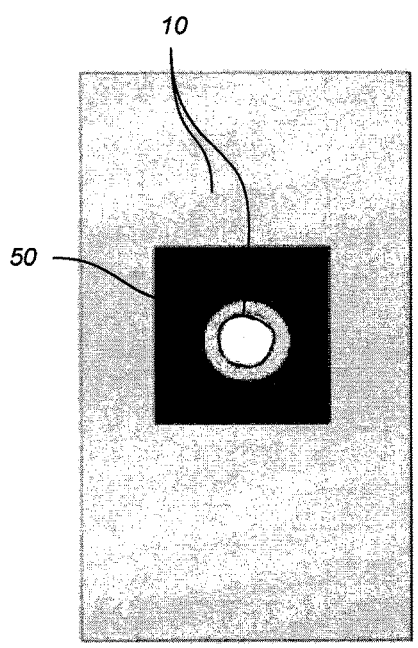
FIG. 8B shows some aspects of a cross-sectional view of a workpiece with eroded portions.

According to one or more exemplary implementations, as shown in FIGS. 8A and 8B, a portion of erosion electrode 100 (proximal, medial, distal, or other) having shape and size with greatest outer diameter or least inner diameter defines the upper portion of eroded space 50, including the opening thereof. For example, as shown in FIGS. 8A and 8B, erosion electrode 100 may have square portions 160 and 170 that extend radially outward at least as far as any other portion of erosion electrode 100. Further, erosion electrode 100 may have a round or circular portion 180 toward distal end 150 thereof. Accordingly, the square portions 160 and 170 define the widest outer boundary of the resultant eroded space 50, as shown in FIG. 8B.

According to one or more exemplary implementations, other variations on shapes, outer diameters, and inner diameters are contemplated by the present disclosure. For example, portions of any embodiment disclosed herein may be combined with portions of other embodiments to yield combinations with unique and programmable capabilities.

According to some exemplary implementations, with varying-cross-section geometries, a part of erosion electrode 100 that does not ever erode (i.e. the "shaft" or a proximal portion of the electrode) is designed with a smaller straight wall cross-section whose diameter is smaller than the more distal portions. Thus, when erosion electrode 100 is well within eroded space 50, the flushing liquid flow clearances are much larger than in the simple straight wall cutting case. Further, the type of material for such a portion may be varied to provide customized results.

According to one or more exemplary implementations, for each new workpiece 10, a new erosion electrode is used, so each hole cut has the same character. According to one or more exemplary implementations, portions of erosion electrode 100 repeat, where the end-point at a portion of erosion electrode 100 from a previous hole cut becomes the starting point of the repeated cross-section of the next cut.

The rate at which distal end 150 of erosion electrode 100 recedes may be known, determinable, controllable, or programmable. Factors such as voltage applied, pulse interval, pulse duration, inter alia contribute to such results. According to one or more exemplary implementations, selection or determination of materials for erosion electrode 100 and workpiece 50, inter alia, contribute to the rate of erosion of each. Polarity of an electrical potential during a spark event (i.e., dielectric breakdown) may contribute to the rate of erosion of each material. Selection, quality, and flow rate of a dielectric fluid may contribute to the rate of erosion. Accordingly, operation of erosion electrode 100 to create eroded spaces 50 is dependent on a variety of factors, each of which may be varied to produce different outcomes. Likewise, aspects and features of the present disclosure may be modified, rearranged, adjusted, scaled, separated and combined to provide selectable outcomes. Any number of sections or portions of erosion electrode 100 presenting distinct geometries may be provided.

FIGS. 9A, 9B, 10A and 10B show a longitudinal section through a hand-held device 210 according to exemplary implementations. The principle structural reference part of the hand-held device 210 is the base 226. The base may be maneuvered by handle 228, which is secured thereto. The handle 228 may be configured to be held in the hand of the workman. Various configurations may be provided to provide hand-held operation of the device 210. According to some exemplary implementations, the handle 228 may carry a switch 30 to activate components of the hand-held device 210, as disclosed herein.

According to some exemplary implementations, mounted on a distal end of the base 226 is a hood 232. The hood 232 defines a workspace, within which erosion activity may occur. The hood 232 may be configured to seal against a portion of a workpiece, such as a frame, thereby enclosing the workspace such that the workspace includes access to at least a portion of a fastener 218, a collar 224, or another workpiece. The portion enclosed may be at least one of the shank of fastener 218, the head of fastener 218, and the collar 224. According to some exemplary implementations, as the hood 232 engages the workpiece, the hood 232 may be configured to enclose the workspace so as to substantially isolate it from the environment outside the workspace. Accordingly, substances within the workspace may be contained except through controlled inlets and outlets, as disclosed herein. For example, at least a portion of the hood 232 may be of a flexible or deformable material that adaptably interfaces with the surface 220 of the workpiece to create a seal at the interface. There may be provided a rigid structure for stabilizing the hand-held device 210 against a workpiece, such as at the surface 220, as shown in the figures. Channels may be provided for passage of dielectric fluid there through.

According to some exemplary implementations, hand-held device 210 may include a ground electrode 238 and erosion electrode 266. The erosion electrode 266 may be configured to controllably approach a portion of a workpiece to be eroded, such as a fastener 218 or a collar.

Figure 10A:
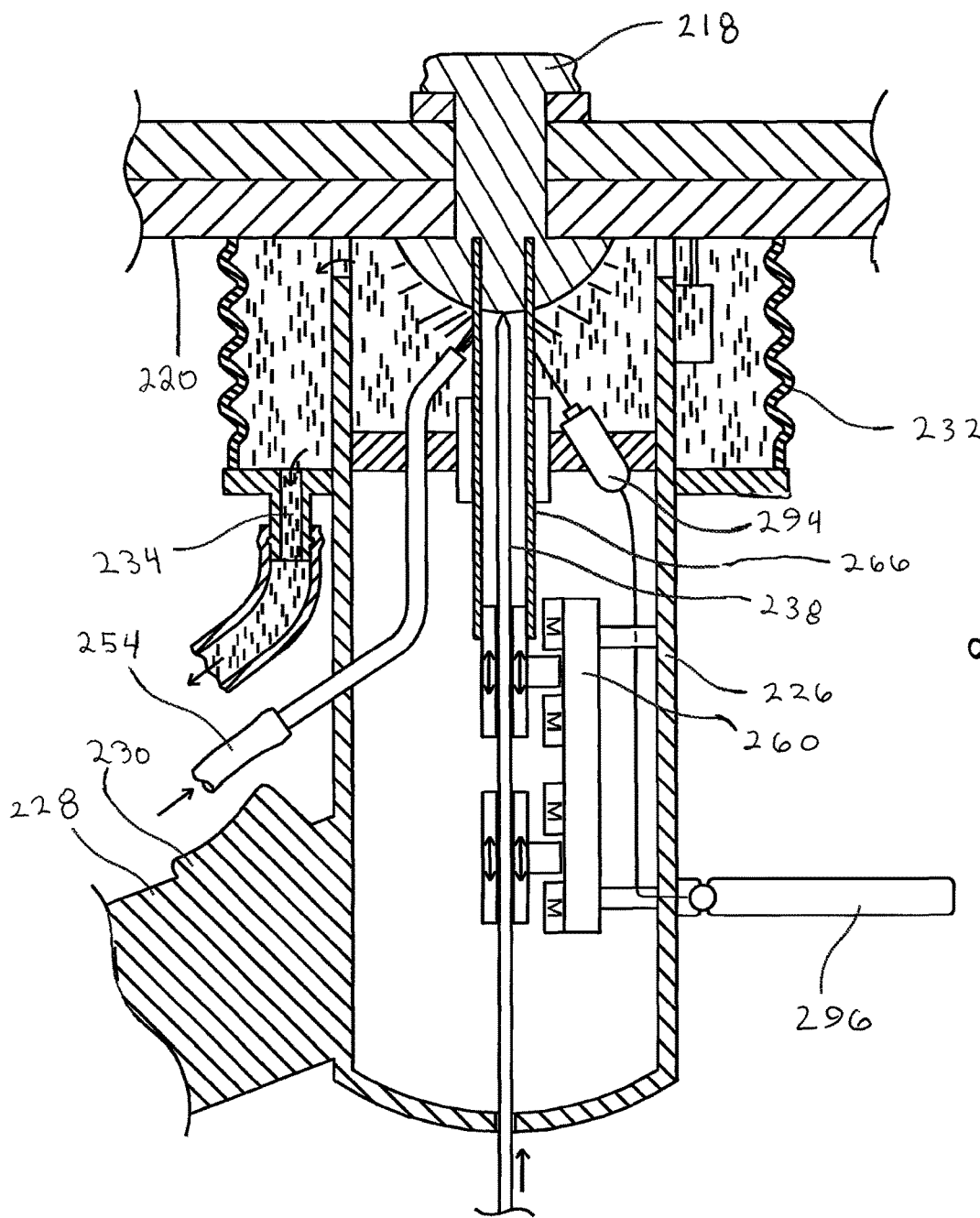
FIG. 10A shows a sectional view of a hand-held EDM device, shown during an erosion process and in association with a fastener to be removed.

According to other exemplary implementations, aspects of which are shown in FIGS. 10A and 10B the erosion electrode 266 may be a hollow tubular structure. In some instances aspects of one exemplary implementation may fit properly into another exemplary implementation. The hollow tubular structure of an erosion electrode 66 may be symmetrical about an axis and configured to travel longitudinally along the axis, thereby eroding a ring-shaped portion of the workpiece. This shape is useful for separating the head flange of a fastener 218 from the shank of the fastener 218. Where erosion of the frame is not desired, such erosion may be minimized or avoided by providing a hollow tubular erosion electrode 266 having an outer diameter that is about equal to or less than the outer diameter of the shank of the fastener 18 or the inner diameter of the hole of the frame. A ground electrode 238 may be disposed central to and concentric with a tubular erosion electrode 266. The ground electrode 238 may be configured to contact at least a portion of the workpiece that is electrically conductive with another portion of the workpiece that is eroded by the erosion electrode 266. For example, where portions of the head, flange, or shank of fastener 218 are to be eroded, the ground electrode 38 may be configured to contact a portion of the fastener 218, such that a dielectric breakdown between the erosion electrode 266 and the fastener 218 may be achieved.

According to some exemplary implementations, an erosion electrode 266 having a hollow tubular structure may be further configured to rotate about its axis of symmetry as it advances longitudinally along the axis. The rotation of the hollow tubular structure helps reduce issues associated with uneven wear of the erosion electrode 266 at its distal end. An uneven electrode results in correspondingly uneven workpiece erosion. This corresponding erosion causes the uneven portions of the erosion electrode 266 to remain uneven, because the gap distance between the erosion electrode 266 and the workpiece (the spark gap) at each point is equal.

When the device is applied to the next fastener, the uneven erosion electrode 66 will be attenuated since the "high" portions of the erosion electrode 266 will contact first, but will not be completely eliminated for multiple cycles. A rotating electrode will recover sooner than a non-rotating electrode. As the hollow tubular structure is rotated as it advances, the orientation of the uneven surface of the erosion electrode 266 is altered with respect to the correspondingly uneven workpiece. The changing relative orientation causes portions of the erosion electrode 266 that may have disproportionately greater extension to be moved into other locations of which may result in increased erosion activity, whereby the continued wear of the erosion electrode 266 is in some circumstances at least partially self-correcting in terms of providing an even erosion electrode 266 and an evenly eroded workpiece.

According to some exemplary implementations, the erosion electrode 266 may be moved by translational motion and rotational motion. According to some exemplary implementations, the translational motion of the erosion electrode 266 may simultaneously create rotational motion. For example, a lead screw may be rotated to advance the erosion electrode 66 and simultaneously rotate it about an axis. According to some exemplary implementations, translational and rotational motion of the erosion electrode 266 may be applied independently, such that rotation and translation may be simultaneously or separately provided.

Figure 9B:
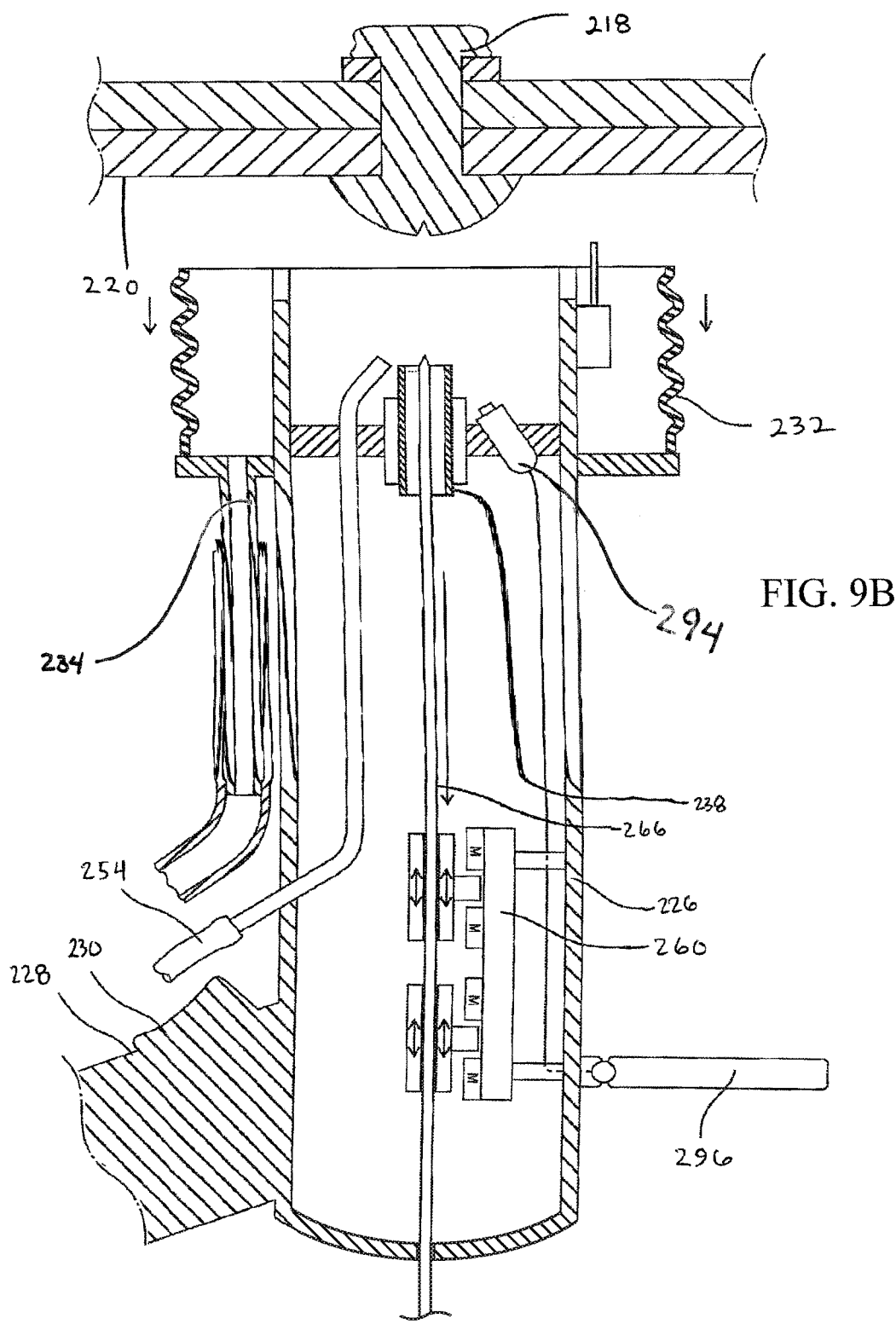
FIG. 9B shows a sectional view of a hand-held EDM device, shown in association with a fastener having a pilot hole.

According to some exemplary implementations, an erosion electrode 266 may be a solid pin configured to penetrate a fastener 218 as shown in FIGS. 9A and 9B. This shape is useful for providing a pilot hole in the fastener 218 for subsequent mechanical drilling. Such pilot holes help control operation of a mechanical drill by providing a non-slip location. This shape electrode is also useful for eroding a central portion of a head of the fastener 218 to allow removal of the flange from the shank (not shown).

While the method and agent have been described in terms of what are presently considered to be the most practical and preferred implementations, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the disclosure both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementation, a method or process implementation, or even merely a variation of any element of these.

Particularly, it should be understood that as the disclosure relates to elements of the disclosure, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this disclosure is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these disclosure(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A forceless electrical erosion and disintegration "FEED" method of producing an overcut gap, the method comprising:

bringing a tubular shaped erosion electrode (100) with an axial length including a distal segment (150) and a proximal segment (160), wherein at least a portion of the distal segment has a cross-sectional geometry that is a greater radius from a cross-sectional geometry of at least a portion of the proximal segment into contact with a workpiece (10);

bring a ground electrode in contact with the work piece (238)

applying high frequency high voltage pulses to an erosion electrode in the presence of dielectric fluid (DF); and, producing an overcut gap (DG) in said workpiece as said erosion electrode erodes said workpiece corresponding to said greater radius proximal segment.

2. The method of claim 1, wherein the overcut gap reduces the amount of debris lodged in between the workpiece and erosion electrode as compared to the amount of debris lodged between a tubular electrode when eroding a workpiece with a homogeneous cross section erosion electrode.

3. The erosion electrode of claim 1, wherein at least a portion of the distal segment is of a smaller inner diameter than an inner diameter of at least a portion of the proximal segment.

4. The erosion electrode of claim 1, wherein at least a portion of the distal segment is of a smaller outer diameter than an outer diameter of at least a portion of the proximal segment.

5. The erosion electrode of claim 1, wherein at least a portion of the distal segment is of a larger inner diameter than an inner diameter of at least a portion of the proximal segment.

6. The erosion electrode of claim 1, wherein at least a portion of the distal segment is of a larger outer diameter than an outer diameter of at least a portion of the proximal segment.

7. The erosion electrode of claim 1, wherein the erosion electrode is of a material that is configured to erode by virtue of a forceless electrical erosion and disintegration "FEED" process.

8. The erosion electrode of claim 1, wherein the axial length of the erosion electrode further includes a medial segment between the distal segment and the proximal segment.

9. The erosion electrode of claim 7, wherein an outer diameter of the distal segment increases from a distal end of the erosion electrode to the medial segment.

10. The erosion electrode of claim 8, wherein an outer diameter of the medial segment decreases from the distal segment to the proximal segment.

11. The erosion electrode of claim 1, wherein a cross-sectional shape of the proximal segment is circular.

12. The erosion electrode of claim 1, wherein a cross-sectional shape of at least a portion of the distal segment is non-circular.

13. The erosion electrode of claim 2, wherein the cross-sectional shape of at least a portion of the distal segment is ovoid.

14. The erosion electrode of claim 2, wherein the cross-sectional shape of at least a portion of the distal segment is square.

15. The erosion electrode of claim 1, further comprising a lumen along the axial length.

16. The erosion electrode of claim 4, wherein the lumen is in fluid communication with a fluid flushing source.

17. The method of claim 1, whereby in the overcut gap of the eroded space (50) debris (15) are evacuated out of said eroded space (50) with greater frequency then debris which become lodged in a eroded space absent an overcut gap.

* * * * *